(12) United States Patent
Black

(10) Patent No.: US 9,117,054 B2
(45) Date of Patent: Aug. 25, 2015

(54) METHOD AND APARATUS FOR PRESENCE BASED RESOURCE MANAGEMENT

(71) Applicant: Websense, Inc., San Diego, CA (US)

(72) Inventor: Robert Barth Black, San Jose, CA (US)

(73) Assignee: Websense, Inc., San Diego, CA (US)

( * ) Notice: Subject to any disclaimer, the term of this patent is extended or adjusted under 35 U.S.C. 154(b) by 79 days.

(21) Appl. No.: 13/724,990

(22) Filed: Dec. 21, 2012

(65) Prior Publication Data

US 2014/0181889 A1 Jun. 26, 2014

(51) Int. Cl.
*G06F 21/00* (2013.01)
*H04L 29/06* (2006.01)
*G06F 21/55* (2013.01)

(52) U.S. Cl.
CPC ............... *G06F 21/00* (2013.01); *G06F 21/55* (2013.01); *H04L 63/0236* (2013.01); *H04L 63/10* (2013.01); *H04L 63/105* (2013.01); *H04L 63/107* (2013.01); *G06F 2221/2111* (2013.01); *H04L 63/108* (2013.01)

(58) Field of Classification Search
CPC ........................................................ H04L 63/20
See application file for complete search history.

(56) References Cited

U.S. PATENT DOCUMENTS

| | | | |
|---|---|---|---|
| 4,423,414 A | 12/1983 | Bryant et al. | |
| 4,734,036 A | 3/1988 | Kasha | |
| 4,941,084 A | 7/1990 | Terada et al. | |
| 5,408,642 A | 4/1995 | Mann | |
| 5,414,833 A | 5/1995 | Hershey et al. | |
| 5,493,692 A | 2/1996 | Theimer et al. | |
| 5,541,911 A | 7/1996 | Nilakantan et al. | |
| 5,548,729 A | 8/1996 | Akiyoshi et al. | |
| 5,555,376 A | 9/1996 | Theimer et al. | |
| 5,581,703 A | 12/1996 | Baugher et al. | |
| 5,586,121 A | 12/1996 | Moura et al. | |
| 5,606,668 A | 2/1997 | Shwed | |
| 5,648,965 A | 7/1997 | Thadani et al. | |
| 5,678,041 A | 10/1997 | Baker et al. | |
| 5,682,325 A | 10/1997 | Lightfoot et al. | |

(Continued)

FOREIGN PATENT DOCUMENTS

EP 0 658 837 A2 6/1995
EP 0 748 095 12/1996

(Continued)

OTHER PUBLICATIONS

"Bloom Filter" on Wikipedia, http://en.wikipedia.org/wiki/Bloom_filter, retrieved on Jul. 31, 2009.

(Continued)

*Primary Examiner* — Matthew Henning
(74) *Attorney, Agent, or Firm* — Knobbe Martens Olson & Bear LLP

(57) ABSTRACT

Methods and apparatus provide resource authorization based on a computer's presence information. Presence information may include information relating to a computer's operating environment. In some implementations, a presence detector on a computer determines presence information and provides the information to a resource manager. The computer may then generate a resource access request. A resource manager may then determine whether the resource request is authorized based, at least in part, on the presence information. The resource manager then responds to the resource access request, either granting or denying the request for resources.

27 Claims, 10 Drawing Sheets

(56) References Cited

U.S. PATENT DOCUMENTS

| | | | |
|---|---|---|---|
| 5,696,486 A | 12/1997 | Poliquin et al. | |
| 5,696,898 A | 12/1997 | Baker et al. | |
| 5,699,513 A | 12/1997 | Feigen et al. | |
| 5,706,507 A | 1/1998 | Schloss | |
| 5,712,979 A | 1/1998 | Graber et al. | |
| 5,724,576 A | 3/1998 | Letourneau | |
| 5,768,519 A | 6/1998 | Swift et al. | |
| 5,774,668 A | 6/1998 | Choquier | |
| 5,781,801 A | 7/1998 | Flanagan et al. | |
| 5,787,253 A | 7/1998 | McCreery et al. | |
| 5,787,427 A | 7/1998 | Benantar et al. | |
| 5,796,944 A | 8/1998 | Hill et al. | |
| 5,799,002 A | 8/1998 | Krishnan | |
| 5,801,747 A | 9/1998 | Bedard | |
| 5,826,014 A | 10/1998 | Coley et al. | |
| 5,828,835 A | 10/1998 | Isfeld et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,835,726 A | 11/1998 | Shwed et al. | |
| 5,842,040 A | 11/1998 | Hughes et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,864,683 A | 1/1999 | Boebert et al. | |
| 5,884,033 A | 3/1999 | Duvall et al. | |
| 5,884,325 A | 3/1999 | Bauer et al. | |
| 5,889,958 A | 3/1999 | Willens | |
| 5,892,905 A | 4/1999 | Brandt et al. | |
| 5,896,502 A | 4/1999 | Shieh et al. | |
| 5,899,991 A | 5/1999 | Karch | |
| 5,899,995 A | 5/1999 | Millier et al. | |
| 5,911,043 A | 6/1999 | Duffy et al. | |
| 5,937,404 A | 8/1999 | Csaszar et al. | |
| 5,941,947 A | 8/1999 | Brown et al. | |
| 5,944,794 A | 8/1999 | Okamoto et al. | |
| 5,950,195 A | 9/1999 | Stockwell et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A | 11/1999 | Freund | |
| 5,991,807 A | 11/1999 | Schmidt et al. | |
| 5,996,011 A | 11/1999 | Humes | |
| 6,052,723 A | 4/2000 | Ginn | |
| 6,052,730 A | 4/2000 | Felciano et al. | |
| 6,055,564 A | 4/2000 | Phaal | |
| 6,065,056 A | 5/2000 | Bradshaw et al. | |
| 6,065,059 A | 5/2000 | Shieh et al. | |
| 6,070,242 A | 5/2000 | Wong et al. | |
| 6,073,239 A | 6/2000 | Dotan | |
| 6,085,241 A | 7/2000 | Otis | |
| 6,092,194 A | 7/2000 | Touboul | |
| 6,105,027 A | 8/2000 | Schneider et al. | |
| 6,154,741 A | 11/2000 | Feldman | |
| 6,173,364 B1 | 1/2001 | Zenchelsky et al. | |
| 6,178,505 B1 | 1/2001 | Schneider et al. | |
| 6,182,118 B1 | 1/2001 | Finney et al. | |
| 6,219,667 B1 | 4/2001 | Lu et al. | |
| 6,233,618 B1 | 5/2001 | Shannon | |
| 6,233,686 B1 | 5/2001 | Zenchelsky et al. | |
| 6,253,188 B1 | 6/2001 | Witek et al. | |
| 6,266,664 B1 | 7/2001 | Russell-Falla et al. | |
| 6,275,497 B1 * | 8/2001 | Varma et al. | 370/431 |
| 6,295,559 B1 | 9/2001 | Emens et al. | |
| 6,338,088 B1 | 1/2002 | Waters et al. | |
| 6,357,010 B1 | 3/2002 | Viets et al. | |
| 6,377,577 B1 | 4/2002 | Bechtolsheim et al. | |
| 6,418,433 B1 | 7/2002 | Chakrabarti et al. | |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 | 11/2002 | Stern | |
| 6,493,758 B1 | 12/2002 | McLain | |
| 6,516,421 B1 * | 2/2003 | Peters | 713/502 |
| 6,519,571 B1 | 2/2003 | Guheen et al. | |
| 6,571,249 B1 | 5/2003 | Garrecht et al. | |
| 6,606,659 B1 | 8/2003 | Hegli et al. | |
| 6,741,997 B1 | 5/2004 | Liu et al. | |
| 6,742,003 B2 | 5/2004 | Heckerman et al. | |
| 6,785,732 B1 | 8/2004 | Bates et al. | |
| 6,804,780 B1 | 10/2004 | Touboul | |
| 6,807,558 B1 | 10/2004 | Hassett et al. | |
| 6,832,230 B1 | 12/2004 | Zilliacus et al. | |
| 6,832,256 B1 | 12/2004 | Toga | |
| 6,839,680 B1 | 1/2005 | Liu et al. | |
| 6,894,991 B2 | 5/2005 | Ayyagari et al. | |
| 6,944,772 B2 | 9/2005 | Dozortsev | |
| 6,978,292 B1 | 12/2005 | Murakami et al. | |
| 7,024,556 B1 * | 4/2006 | Hadjinikitas et al. | 713/168 |
| 7,058,822 B2 | 6/2006 | Edery et al. | |
| 7,089,246 B1 | 8/2006 | O'Laughlen | |
| 7,093,293 B1 | 8/2006 | Smithson et al. | |
| 7,096,493 B1 | 8/2006 | Liu | |
| 7,136,631 B1 * | 11/2006 | Jiang et al. | 455/414.1 |
| 7,136,867 B1 | 11/2006 | Chatterjee et al. | |
| 7,185,015 B2 | 2/2007 | Kester et al. | |
| 7,185,361 B1 | 2/2007 | Ashoff et al. | |
| 7,194,464 B2 | 3/2007 | Kester et al. | |
| 7,197,713 B2 | 3/2007 | Stern | |
| 7,209,893 B2 | 4/2007 | Nii | |
| 7,213,069 B2 | 5/2007 | Anderson et al. | |
| 7,313,823 B2 | 12/2007 | Gao | |
| 7,359,372 B2 | 4/2008 | Pelletier et al. | |
| 7,376,154 B2 | 5/2008 | Ilnicki et al. | |
| 7,376,969 B1 | 5/2008 | Njemanze et al. | |
| 7,478,418 B2 * | 1/2009 | Supramaniam et al. | 726/1 |
| 7,590,716 B2 | 9/2009 | Sinclair et al. | |
| 7,603,685 B2 | 10/2009 | Knudson et al. | |
| 7,603,687 B2 | 10/2009 | Pietraszak et al. | |
| RE41,168 E | 3/2010 | Shannon | |
| 7,690,013 B1 | 3/2010 | Eldering et al. | |
| 8,549,581 B1 * | 10/2013 | Kailash et al. | 726/3 |
| 2001/0032258 A1 | 10/2001 | Ishida et al. | |
| 2001/0039582 A1 | 11/2001 | McKinnon et al. | |
| 2001/0047343 A1 | 11/2001 | Dahan et al. | |
| 2002/0042821 A1 | 4/2002 | Muret et al. | |
| 2002/0049883 A1 | 4/2002 | Schneider et al. | |
| 2002/0062359 A1 | 5/2002 | Klopp et al. | |
| 2002/0073089 A1 | 6/2002 | Schwartz et al. | |
| 2002/0087882 A1 | 7/2002 | Schneier et al. | |
| 2002/0110084 A1 | 8/2002 | Butt et al. | |
| 2002/0129039 A1 | 9/2002 | Majewski et al. | |
| 2002/0129140 A1 | 9/2002 | Peled et al. | |
| 2002/0129277 A1 | 9/2002 | Caccavale | |
| 2002/0133509 A1 | 9/2002 | Johnston et al. | |
| 2002/0144129 A1 | 10/2002 | Malivanchuk et al. | |
| 2002/0152284 A1 | 10/2002 | Cambray et al. | |
| 2002/0178374 A1 | 11/2002 | Swimmer et al. | |
| 2003/0005112 A1 | 1/2003 | Krautkremer | |
| 2003/0009495 A1 | 1/2003 | Adjaoute | |
| 2003/0023860 A1 | 1/2003 | Eatough et al. | |
| 2003/0033525 A1 | 2/2003 | Rajaram | |
| 2003/0074567 A1 | 4/2003 | Charbonneau | |
| 2003/0093694 A1 | 5/2003 | Medvinsky et al. | |
| 2003/0097617 A1 | 5/2003 | Goeller et al. | |
| 2003/0120543 A1 | 6/2003 | Carey | |
| 2003/0126136 A1 | 7/2003 | Omoigui | |
| 2003/0126139 A1 | 7/2003 | Lee et al. | |
| 2003/0135611 A1 | 7/2003 | Kemp et al. | |
| 2003/0149930 A1 | 8/2003 | Rey et al. | |
| 2003/0177187 A1 | 9/2003 | Levine et al. | |
| 2003/0177389 A1 * | 9/2003 | Albert et al. | 713/201 |
| 2003/0185399 A1 | 10/2003 | Ishiguro | |
| 2004/0003139 A1 | 1/2004 | Cottrille et al. | |
| 2004/0015586 A1 | 1/2004 | Hegli et al. | |
| 2004/0019656 A1 | 1/2004 | Smith | |
| 2004/0034794 A1 | 2/2004 | Mayer et al. | |
| 2004/0049514 A1 | 3/2004 | Burkov | |

(56) References Cited

U.S. PATENT DOCUMENTS

| | | | |
|---|---|---|---|
| 2004/0062106 A1 | 4/2004 | Ramesh et al. | |
| 2004/0068479 A1 | 4/2004 | Wolfson et al. | |
| 2004/0078591 A1 | 4/2004 | Teixeira et al. | |
| 2004/0105416 A1 | 6/2004 | Rue | |
| 2004/0111499 A1 | 6/2004 | Dobrowski et al. | |
| 2004/0111519 A1* | 6/2004 | Fu et al. | 709/229 |
| 2004/0123157 A1 | 6/2004 | Alagna et al. | |
| 2004/0128285 A1 | 7/2004 | Green et al. | |
| 2004/0153644 A1 | 8/2004 | McCorkendale | |
| 2004/0172389 A1 | 9/2004 | Galai et al. | |
| 2004/0181788 A1 | 9/2004 | Kester et al. | |
| 2004/0220924 A1 | 11/2004 | Wootton | |
| 2005/0015626 A1 | 1/2005 | Chasin | |
| 2005/0033967 A1 | 2/2005 | Morino et al. | |
| 2005/0034241 A1* | 2/2005 | Prince et al. | 5/690 |
| 2005/0066197 A1 | 3/2005 | Hirata et al. | |
| 2005/0091535 A1 | 4/2005 | Kavalam et al. | |
| 2005/0131868 A1 | 6/2005 | Lin et al. | |
| 2005/0132042 A1 | 6/2005 | Cryer | |
| 2005/0132184 A1 | 6/2005 | Palliyil et al. | |
| 2005/0155012 A1 | 7/2005 | Tayama et al. | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2005/0283836 A1 | 12/2005 | Lalonde et al. | |
| 2006/0004636 A1 | 1/2006 | Kester et al. | |
| 2006/0004717 A1 | 1/2006 | Ramarathnam et al. | |
| 2006/0026105 A1 | 2/2006 | Endoh | |
| 2006/0031504 A1 | 2/2006 | Hegli et al. | |
| 2006/0053488 A1 | 3/2006 | Sinclair et al. | |
| 2006/0068755 A1 | 3/2006 | Shraim et al. | |
| 2006/0075494 A1 | 4/2006 | Bertman et al. | |
| 2006/0095404 A1 | 5/2006 | Adelman et al. | |
| 2006/0095459 A1 | 5/2006 | Adelman et al. | |
| 2006/0095586 A1 | 5/2006 | Adelman et al. | |
| 2006/0095965 A1 | 5/2006 | Phillips et al. | |
| 2006/0101514 A1 | 5/2006 | Milener et al. | |
| 2006/0129644 A1 | 6/2006 | Owen et al. | |
| 2006/0190525 A1* | 8/2006 | Bobde et al. | 709/202 |
| 2006/0265750 A1 | 11/2006 | Huddleston | |
| 2007/0005762 A1 | 1/2007 | Knox et al. | |
| 2007/0011739 A1 | 1/2007 | Zamir et al. | |
| 2007/0024580 A1* | 2/2007 | Sands et al. | 345/156 |
| 2007/0028302 A1 | 2/2007 | Brennan et al. | |
| 2007/0124388 A1 | 5/2007 | Thomas | |
| 2007/0156833 A1 | 7/2007 | Nikolov et al. | |
| 2007/0260602 A1 | 11/2007 | Taylor | |
| 2007/0300312 A1* | 12/2007 | Chitsaz et al. | 726/34 |
| 2008/0066143 A1* | 3/2008 | Charles Tai et al. | 726/1 |
| 2008/0077995 A1 | 3/2008 | Curnyn | |
| 2008/0104196 A1* | 5/2008 | Yalakanti et al. | 709/217 |
| 2008/0209577 A1* | 8/2008 | Vrielink et al. | 726/29 |
| 2008/0267144 A1 | 10/2008 | Jano et al. | |
| 2008/0295177 A1 | 11/2008 | Dettinger et al. | |
| 2010/0005165 A1 | 1/2010 | Sinclair et al. | |
| 2010/0228614 A1* | 9/2010 | Zhang et al. | 705/14.16 |
| 2013/0331101 A1* | 12/2013 | Thomas et al. | 455/435.1 |

FOREIGN PATENT DOCUMENTS

| | | |
|---|---|---|
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 494 409 | 1/2005 |
| EP | 1 510 945 | 3/2005 |
| FR | 2 811 494 | 1/2002 |
| GB | 2418330 | 3/2006 |
| JP | 10 243018 | 9/1998 |
| JP | 2000-235540 | 8/2000 |
| JP | 2002-358253 | 12/2002 |
| JP | 2003-050758 | 2/2003 |
| JP | 2004-013258 | 1/2004 |
| WO | WO 92/19054 | 10/1992 |
| WO | WO 96/05549 A1 | 2/1996 |
| WO | WO 96/42041 | 12/1996 |
| WO | WO 01/33371 | 5/2001 |
| WO | WO 01/55873 | 8/2001 |
| WO | WO 01/63835 | 8/2001 |
| WO | WO 2005/017708 | 2/2005 |
| WO | WO 2006/027590 | 3/2006 |
| WO | WO 2006/062546 | 6/2006 |
| WO | WO 2006/136605 | 12/2006 |

OTHER PUBLICATIONS

"Google + StopBadward.org = Internet Gestapo?", http://misterpoll.wordpress.com/2007/01/05/google-stopbadwareorg-internet-gestapo/, Jan. 5, 2007.

"Trends in Badware 2007", StopBadware.org.

C. L. Schuba and E. H. Spafford, Countering abuse of name-based authentication, Pub: In 22nd Annual Telecommunications Policy Research Conference, 1996, pp. 21.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

European Search Report for Application No. 02258462.7, Jan. 30, 2006.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=6882 7537> [retrieved on Dec. 7, 2007], Apr. 23, 2006-Apr. 27, 2006, pp. 1166-1171.

George, Erica, "Google launches new anti-badware API", http://blog.stopbadware.org//2007/06/19/google-launches-new-anti-badware-api, Jun. 19, 2007.

Gittler F., et al., The DCE Security Service, Pub: Hewlett-Packard Journal, Dec. 1995, pp. 41-48.

Hubbard, Dan, Websense Security Labs, The Web Vector: Exploiting Human and Browser Vulnerabilities, Toorcon 2005 (http://www.toorcon.org).

IBM Technical Disclosure Bulletin, Mean to Protect System from Virus, IBM Corp., Aug. 1, 1994, Issue 659-660.

International Search Report and Written Opinion dated Jun. 30, 2008 for PCT Patent Application No. PCT/US2007/024557.

International Search Report and Written Opinion for PCT Application No. PCT/US2007/015730 dated Dec. 27, 2008, 16 pages.

International Search Report for PCT/US2010/035992, Aug. 11, 2010.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Newman, H., A Look at Some Popular Filtering Systems, Pub: Internet, Online!, Jul. 25, 1999, pp. 1-11.

Parental Control White Paper, Internet Citation, Aug. 2001; Retrieved from: http://www.planetweb.com/products/web/pcwhitepaper.html [retrieved on Mar. 18, 2004].

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Secure Computing Corporation, SmartFilter™ Web Tool, Dec. 1, 1998, pp. 1-2.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.com/www/jms/nw-firewall.html, Network World, Jan. 29, 1996, pp. 1-8.

Supplementary European Search Report for EPO App. No. 00 90 7078, May 18, 2004.

SurfWatch Software, SurfWatch® Professional Edition: Product Overview, Pub: Internet, Online!, May 26, 1999, pp. 1.

(56) References Cited

OTHER PUBLICATIONS

Symantec Corporation, E-security begins with sound security policies, Announcement Symantec, XP002265695, Jun. 14, 2001, pp. 1,9.

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

Williams, R., Data Integrity with Veracity, Retrieved from the Internet: <URL: ftp://ftp.rocksoft.com/clients/rocksoft/papers/vercty10.ps>, Sep. 12, 1994.

Wobus, J., DHCP FAQ, www.nd.edu/~milind/FAQs/FAQ_dhcp, Dec. 29, 1995, pp. 1-10.

Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

* cited by examiner

METHOD AND APARATUS FOR PRESENCE BASED RESOURCE MANAGEMENT

TECHNICAL FIELD

This disclosure relates to managing computing resources based on presence information. Specifically, methods and apparatus for managing access to computing resources by considering a computer's operating environment and interactions with one or more users are disclosed.

BACKGROUND

The security risk to corporate electronic assets is evolving due to several industry trends. First, the use of mobile devices, such as smart phones, is being widely adopted across the business community. As they adopt them, the users of mobile devices expect to use those devices to perform many of their day to day business processes. For example, smart phones are now used to access corporate email systems and other critical business systems that contain potentially vast amounts of sensitive information. This sensitive information may include, for example, health information (PHI), personally identifiable information (PII), financial information and confidential intellectual property. The existence of this sensitive information on mobile devices makes the information susceptible to data losses, for example, in cases in which the device is lost or stolen.

While the use of mobile devices increases the risk to corporate data generally, the risk may be based on how the mobile device is being used. For example, mobile devices located in certain regions or countries may present an increased risk to corporate data over mobile devices used in other regions or countries. Similarly, mobile devices utilizing particular network connection methods may present a higher risk (for example, sending data over unencrypted channels), when compared to other mobile devices.

While use of mobile devices is increasing the risk to corporate information assets, the evolving malicious software threat is also increasing that risk. Previous generations of malicious software might often destroy data on a computer or network after gaining control of a host computer. However, more modern malicious programs may take a more insidious approach. For example, instead of immediately damaging or destroying the infected hosts and their associated data, modern malicious applications may instead quietly subvert the host so that it may be put to use by the attacker. One of the more damaging attack profiles occurs when a malicious application is able to gain control of a computer for the purposes of forming a botnet.

A botnet is a network of compromised computers, each of which is known as a "bot." These compromised computers, acting on the attacker's behalf and unbeknownst to the rightful owner of the computer, perform a variety of nefarious tasks, including participating in denial of service attacks or the sending of spam email.

Data theft from malicious software is also becoming an increasing problem. Fifty five percent of data loss is now attributed to data stealing malware web communications. The remaining 45% of non web malware communications is caused by Trojans or email communications over non-web channels.

In some cases, a legitimate user may be unaware that their computer is infected with malicious software. This software may operate covertly, refraining from activities that may draw attention to its presence, such as excessive use of computing resources, including CPU, I/O channel bandwidth, network access, and the like.

SUMMARY

Embodiments of the disclosure may include a method of managing a computer's access to resources. The method may include receiving a request for computer resources, executing instructions on computer hardware to determine presence information relating to the computer, determining a resource control policy to apply to the request for computer resources based on the presence information, and executing instructions on computer hardware to allow or disallow the request for resources based on the policy. In an embodiment, the presence information indicates an interactivity level on the computer. In some of these embodiments, an interactivity level is based on whether an input has been received from an input device directly connected to the computer within a time period. In some embodiments, the interactivity level is based on whether an interactive shell is running on the computer. In an embodiment, the interactivity level is based on whether a screen saver is active on the computer's console. In an embodiment, the interactivity level is based on the amount of idle CPU cycles on the computer within a time period.

In some embodiments, the presence information indicates whether the computer is communicating over a secure network connection. In some embodiments, the presence information indicates the computer's location within a corporate network. In some embodiments, the presence information indicates the physical location of the computer.

In some embodiments, the resource control policy controls the use of hardware resources of the computer. In some embodiments, the resource control policy controls access to network data by the computer. In some of these embodiments, the access to network data is controlled based, at least in part, on one or more content categories of a URL identifying the network data.

In some of these embodiments, a first set of URL categories are accessible to the computer when the presence information indicates a first presence state and a second set of URL categories are accessible to the computer when the presence information indicates a second presence state.

In some other embodiments, the resource control policy controls whether network communication by the computer is encrypted. In some embodiments, the resource control policy controls whether network data sent by the computer is compressed. In some embodiments, the resource control policy controls whether network data sent by the computer is signed.

In some embodiments, the resource control policy controls the rate at which data sent or received by the computer may be transferred on a network. In some embodiments, the resource control policy controls content of email messages sent by the computer.

Another innovative aspect disclosed is an apparatus for managing a computer's access to resources. The apparatus includes a memory, a processor, configured to fetch instructions from the memory, a network interface, operatively coupled to the processor. The memory stores a presence management module, configured to cause the processor to receive and store presence information for the computer to a storage, a URL filtering interface module, configured to cause the processor to receive a URL access request including a requested URL, a URL categorization module, configured to cause the processor to determine one or more URL categories of the requested URL, a policy determination module, configured to cause the processor to determine a policy to apply to the requested URL based, at least in part, on the presence information for the computer, and a policy application module, configured to cause the processor to authorize or not authorize access to the requested URL by the computer based, at least in part, on the determined policy and the one or more URL categories. In some embodiments of the apparatus, the presence information indicates an interactivity level of the computer. In some embodiments, the URL access request is based, at least in part, on a request for the URL by the computer.

Another innovative aspect disclosed is an apparatus including a means for determining presence information relating to a computer, and a means for applying a resource control policy based on the presence information. In some embodiments, the presence information indicates at least one of an interactivity level of the computer or the computer's location within a corporate network, and wherein the resource control policy controls access to network data based, at least in part, on one or more content categories of a URL identifying the network data.

Another innovative aspect is a non-transitory computer readable medium, storing instructions that when executed by a processor perform a method of preventing the loss of sensitive data on a mobile device. The method includes determining presence information relating to a computer, and applying a resource control policy based on the presence information.

In some embodiments, the presence information indicates at least one of an interactivity level of the computer or the computer's location within a corporate network. In some embodiments, the resource control policy controls access to network data based, at least in part, on one or more content categories of a URL identifying the network data.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
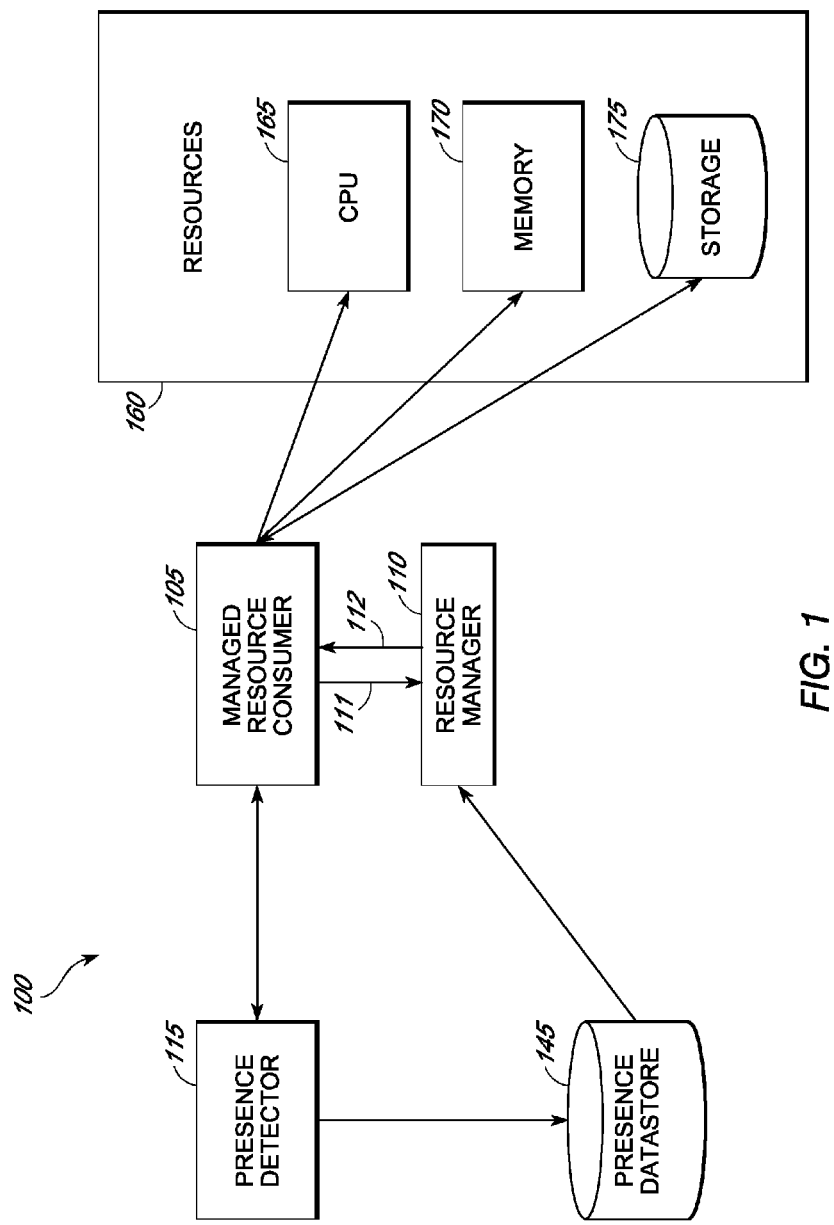
FIG. 1 illustrates a resource management system 100.

As described above, the risks presented by mobile devices and malicious applications are substantial. For example, mobile devices may travel to destinations that present inherent risk to corporate assets. Furthermore, a corporate computer infected so as to join a botnet may participate in denial of service attacks or act as an agent for the sending of spam email. These actions by a corporate owned asset could subject the legitimate owner of the computer to legal liability or at a minimum result in negative publicity. Compromised computers may also act as agents for the attacker by sending sensitive data accessible from the compromised computer to the attacker.

To mitigate the effects of these risks, a computer's access to resources may be specifically tailored to minimize risk while providing the access necessary to perform important functions. Applications running on a computer have access to a variety of resources, including both resources local to the computer itself, such as processing power, disk space, and I/O channel bandwidth, but also resources external to the computer. These resources may include network bandwidth, and access to a variety of network applications such as email, internet browsing, network file transfer, networked file storage, and many more.

Depending on the computer's operating environment or presence, legitimate resource needs of a computer application may vary. Additionally, some operating environments present inherently greater risk than others. Therefore, some implementations may vary the accessibility of resources to applications running on the computer based on the computer's operating environment.

A computer's operating environment or presence may encompass various aspects of how the computer is being used. For example, presence information may encompass interactivity aspects of the computer, network connectivity aspects of the computer, or location aspects of the computer. For example, presence may encompass an interactivity level of the computer. Whether a user is currently logged in and working with the computer may be one dimension of an interactivity level. In some implementations for example, whether a computer's console is locked may indicate whether an interactive session is currently active, and whether a user is currently logged in and using the computer. Similarly, activation of a screen saver may provide a similar indication. Whether input has been received from a physically attached keyboard or pointing device may also provide an level of interactivity in some implementations.

The absence or presence of an interactive shell program may also provide an indication of whether the computer is currently being used in an interactive manner. Some computer operating systems support multi-user or remote login capability that provides for interactive use of the computer without use of the console. Implementations for managing resources on these computers may use the presence or activity of an interactive shell program that supports multi-user or remote login capabilities to provide an indication of whether the computer is currently in an interactive mode.

The allocation or authorization of resources to the computer may be based on the interactivity level determined by presence information. When an interactive session is active on a computer, an employee may be actively using an email application, and computing resources may be made available to applications running on the computer to ensure the interactive session is productive.

If the employee steps away from the computer, for example, to attend a meeting, the interactive shell they were using may become inactive. For example, a screen saver may activate, the terminal (such as the console) used by the interactive session may become locked, or their interactive shell program (such as the interactive shell described above), may stop consuming CPU cycles. When the interactive session becomes inactive or ends, the interactivity level of the computer is reduced, and resources authorized for use by applications running on the computer may be different when compared to when the interactive session was active and the interactivity level was also higher. The amount of CPU, I/O bandwidth, network data received or transferred, or the set of network applications that may send or receive data with the computer (for example, based on the network ports used by the network applications) may be different than when an interactive session is active on the computer. Some implementations, for example, may allow the computer to receive email when no interactive session is present, but not allow the computer to send email during that time.

In some implementations, the allocation or authorization of resources to the computer may be based on the ambient light or display settings of an interactive environment. For example, presence information may include the level of ambient light at a user's computer, or the display settings of a user's display. Display settings such as font size or the contrast level between the font and the background may be considered presence information. In some implementations, the display or transfer of sensitive information on or to a user's computer may be prohibited by a policy if the font size is above a predetermined threshold. In some other implementations, whether certain information may be displayed by or transferred to a computer may be based on the contrast level of a font on the computer. For example, some implementations may guard against the display of presentations on a display in environments outside a corporate network.

The type of display connected to a computer may also be considered presence information. In some implementations, access to network content may be based on the type of displays connected to a computer. For example, if a projection device is connected to a computer, some implementations may prohibit the transfer or display of certain types of content (for example, sensitive content) on or to the computer.

Whether a privacy shield is installed on a computer' display may also be considered presence information, with policies that control the transfer or display of information on or to the computer based on whether the privacy shield is installed. For example, some displays may include sensors or switches that are activated when a privacy shield is installed. A policy may then control access to some data based on output from the sensors or switches.

In some implementations, particular display technologies may provide more privacy than others. For example, the viewing angle of some LCD displays may be more restricted than the viewing angle of other display technologies. In these implementations, the display technology or viewing angle may be considered presence information, with policies controlling access to some data based on the display technology or viewing angle parameters present in an interactive environment.

Some implementations may also vary access to network content identified by URLs based on presence information. For example, when an interactive session is active on a computer, the computer may be allowed to access and download network content from a first set of URL site categories. When no interactive session is active, a second set of URL categories may be accessible, which is different than the first set. Alternatively, implementations may vary a whitelist or blacklist of accessible URL categories or sites based on presence information.

In some implementations, available resources may vary based on the interactivity of the session running a particular application. For example, on a multi-user or multi account computer system, an application running under an account during an active interactive session may be provided with a first set of resource allocations, while the same application running under an account when there is no active interactive session may be provided with a second set of resource allocations.

In addition to interactivity, some aspects of presence may relate to the location of the computer. The risk to corporate data on a computing device may vary with the devices location, either geographically or by its location within a corporate intranet. For example, certain geographic locations may present a higher risk of theft to a corporate mobile device. Other locations may provide network communications infrastructure that is susceptible to snooping or industrial espionage. The security of corporate intranets may also vary. For example, while remote offices may include connections to the corporate intranet, their communications infrastructure may not receive the same level of management as the infrastructure at a corporate headquarters.

Presence may include the computer's physical location on the planet earth, for example, represented by latitude and longitude coordinates. Other aspects of presence relate to the computer's location within a network topology. For example, is the computer located at a corporate headquarters, a branch office, or VPN'ed into the corporate network from a coffee shop.

Therefore, some implementations may determine a resource control policy based on a computer's geographic location or location within a network topology. These resource control policies may, for example, vary the rate at which the computer can send or receive network data based on the computer's location. Some implementations may utilize policies that vary the network path used to communicate with the computer based on the computer's location.

Because the risk to the security of corporate data may vary by location, some implementations may vary the encryption requirements for data sent or received over a network based on the computer's location. Some other implementations may require that certain or all network data sent or received by a computer be electronically signed based on the computer's location. The location of the computer may also determine which network applications are accessible to applications running on the computer. For example, which particular protocol ports may be available to send data on or receive data on may be determined based on the location of the computer. The location of the computer may also determine the content of email messages sent or received by the computer. For example, in some implementations, an email header or footer may be inserted into emails sent from a particular location. The email header or footer may provide notice to the reader that the email was transferred through a less secure location, so that proper considerations may be taken when replying to the email or when opening attachments.

In some implementations, a data policy may not require that data stored on a storage medium be encrypted when a computer is operating within a defined geographic region or connected to a particular set of networks. For example, some implementations may determine that a computer is within a corporate campus based on its geographic location. Some implementations may determine that a computer is operating within a corporate network when it is connected directly to a corporate network or connected via a VPN to the corporate network. These implementations may determine that storage accessed by the computer can be unencrypted when operating in these environments.

These implementations may also detect when the computer transitions from the previously described "secure" environments, such as a corporate campus, to a less secure environment. For example, these implementations may detect when a computer moves off the corporate campus based on its geographic location, or they may detect when the computer connects directly to a non-corporate network. In these implementations, a policy may further require that a storage be encrypted when the computer is operating in a less secure environment. Some implementations may trigger an audit of a computer or a storage based on detecting a change in a security level of the computer's operating environment. One result of an audit could be that data accessed by or located on the computer be encrypted.

Presence information may also include one or more characteristics of the network connection used by the computer. This presence information may be used to determine parameters of the network connections, or restrictions on the type of data sent or received over that network connection. For example, the security level of the network connection may determine whether data sent or received by the computer should be encrypted. The security level of the network connection may also determine whether the resource control policy requires that data sent or received by the computer be electronically signed.

Presence information may also include the speed of a network connection used by the computer. A resource control policy may then be based on this presence information. For example, the rate at which the computer is authorized to send or receive data over a network connection may be based on the speed of the network connection. In some implementations, whether data sent or received by the computer is compressed may be based on whether the speed of the network connection used by the computer is below a threshold.

FIG. 1 illustrates a resource management system 100. The resource management system includes a managed resource consumer (MRC) 105. The MRC may be any entity that requires access to resources. For example, in the illustrated implementation, the MRC may be one or more application programs running on a computer. Alternatively, the MRC may be components of an operating system running on a computer. In other implementations, the MRC may be a node operating on a network.

The system 100 also includes a resource manager 110, a presence detector 115, a presence datastore 145, and resources to be managed 160. Resources to be managed 160 in the implementation of FIG. 1 include a CPU 165, and memory 170, and a storage 175. However, it should be noted that these are just examples, and not intended to limit the number or types of resources that may be managed by the proposed resource management system. For example, hardware resources of a computer may be managed as shown. In other implementations, the resources 160 may include network resources. In these implementations, the resource management system may manage how a MRC interacts with a communications network and utilizes the resources of the communications network. For example, the type, category, speed, security, or amount of data sent or received over a communications network may be managed.

Before accessing a resource 160, the MRC may submit a resource request 111 to the resource manager 110. The resource manager determines whether access to the resource, for example, any of the resources to be managed 160, should be granted. The decision may be based, at least in part, on presence information. Presence information may relate to one or more aspects of the MRC 105. For example, presence information may relate to the location, interactivity, or network connectivity of the MRC 105. Presence information is obtained in the illustrated implementation by the resource manager 110 from the presence datastore 145. The presence information may be written to the presence datastore by the presence detector 115.

In other implementations, presence information may be obtained by the resource manager 110 directly from the presence detector 115. For example, the resource manager 110 may periodically poll the presence detector to retrieve presence information. Alternatively, the presence detector 115 may asynchronously transmit presence information to the resource manager. For example, when presence information changes on the client computer running the presence detector, the presence detector may then send an update to the resource manager 110.

After the resource manager has made a determination of whether the MRC 105 may have access to a resource, it sends a resource response 112 to the MRC 105. The resource response may indicate whether the MRC 105 may have access to the requested resource.

Figure 2A:
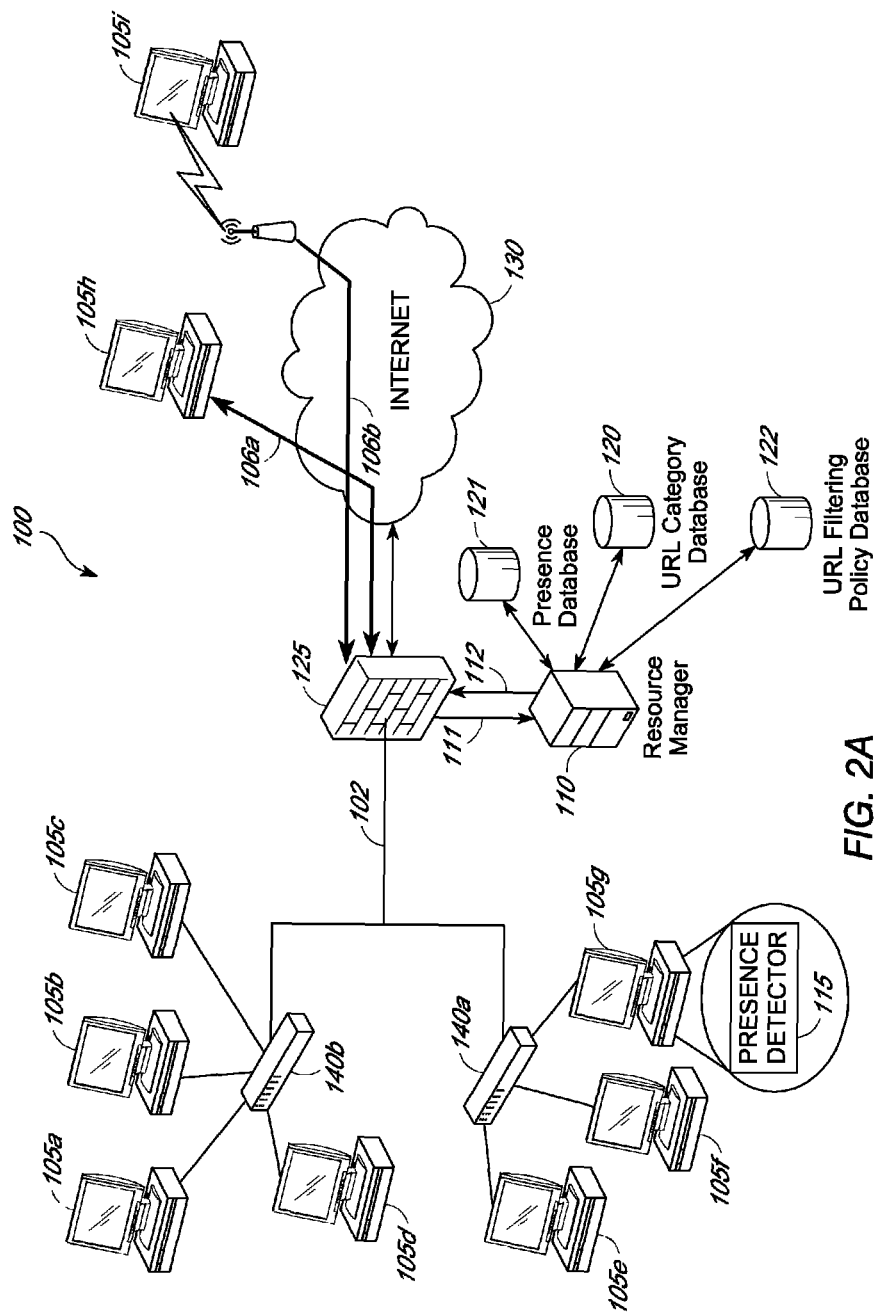
FIG. 2A illustrates one implementation of a resource management system 100.

FIG. 2A illustrates one implementation of a resource management system 100. The resource management system 100 includes managed resource consumers 105a-i. In the illustrated implementation, the managed resource consumers 105a-i are client computers 105a-i. Client computers 105a-g are connected to the Internet 130 via one or more network switches 140a-b and a firewall 125. Computers 105h-i are provided with access to corporate intranet 102 via VPN connections 106a and 106b. Computers 105h-i access to Internet content identified by URLs may, in some implementations, be managed by a resource manager 110. In the illustrated implementation, the resource manager is a resource manager 110. In other implementations firewall 125 may be a resource manager. The resource manager may also be a network sniffer, router, proxy, cache, or switch.

In the illustrated implementation, the firewall 125 is in communication with the resource manager 110. In some implementations, resource manager 110 may be a URL filter server. For example, resource manager 110 may apply an access control policy to a URL access request. The access control policy may be based, at least in part, on a category of content stored at a destination server identified by the URL. The resource manager 110 in this implementation is in communication with a URL category database 120 and a URL filtering policy database 122. Client computers 105-a-i access the Internet 130 via firewall 125. Each client computer 105a-i includes a presence detector 115. In the illustrated implementation, the presence detector 115 runs on each client computer 105a-i. The presence detector 115 detects presence information for the client computer 105a-i and sends the presence information to a presence datastore. In the illustrated implementation, the presence information sent by the presence detector 115 is sent to the resource manager or resource manager 110 and stored in a presence database 121. This presence information may be read by the resource manager 110 when determining whether resource requests 111 for URLs should be authorized.

Figure 2B:
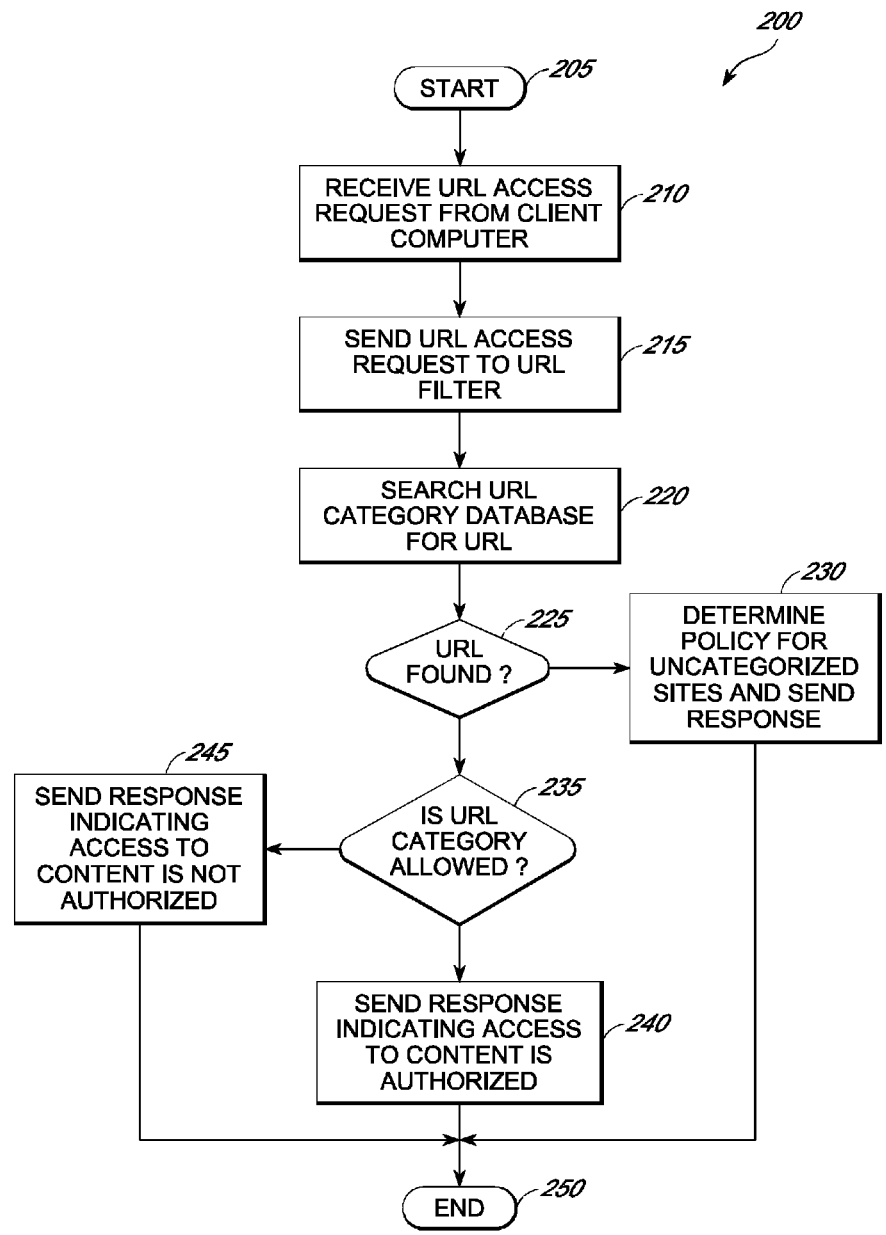
FIG. 2B is a flowchart illustrating one method of accessing network content identified by a URL in the system 100 of FIG. 2A.

FIG. 2B is a flowchart illustrating one method of accessing network content identified by a URL in the system 100 of FIG. 2A. Process 200 may be implemented by a combination of the firewall 125 and resource manager 110 illustrated in FIG. 2A. Process 200 begins at start block 205 and then moves to block 210, where a URL access request is received from a client computer. In some implementations, the URL access request may be an HTTP request generated by a client computer, for example, by a browser application running on a client computer. When one of client computers 105a-i attempts to access content identified by a URL, the client computer sends a request that is received by the firewall 125.

Process 200 then moves to processing block 215, where a URL access request is sent to a URL filter. In some implementations, if a firewall 125 receives the URL access request from a client computer 105, the firewall 125 sends a resource request 111 to the resource manager 110. The resource request 111 in the implementation illustrated by FIG. 2 may include the URL requested by the client computer.

Process 200 then moves to block 220. Upon receiving the resource request 111, the resource manager 110 searches the URL category database for the URL to identify one or more categories assigned to the URL. Process 200 then moves to decision block 225. If the URL is not found in the category database, process 200 moves to processing block 230, where a policy for handling uncategorized URLs is determined. An appropriate reply may be sent, based at least in part, on the policy determined in process block 230. If one or more categories are found in decision block 225, process 200 moves to decision block 235. In decision block 235, one or more categories may be compared to categories allowed by a URL filtering policy. The URL filtering policy may be stored in the URL filtering policy database 122, illustrated in FIG. 2. The URL filtering policy applied to the URL may be based on presence information in the presence database 121. Specifically, it may be based on presence information relating to the client computer (one of client computers 105a-i) that initiated the resource request. This information may have been previously stored in the presence database 121, for example, by process 550 illustrated in FIG. 10.

If the URL category is allowed by the URL filtering policy, process 200 moves to processing block 240, where the URL filter sends a resource response 112 to the firewall 125 indicating access to the content identified by the URL is authorized. Upon receiving this response, the firewall 125 may allow the client computers generating the original request to access the Internet content identified by the URL. If the URL category is not allowed by the URL filtering policy, process 200 moves from decision block 235 to decision block 245, where the URL filter sends a resource response 112 to the firewall 125 indicating that access to the URL by the computer is not authorized. Upon receiving the resource response 112, the firewall may disallow access to the URL by the client computer. Whether process 200 executes processing block 240 or processing block 245, after processing of either block is complete, process 200 moves to end block 250 and terminates.

Figure 3:
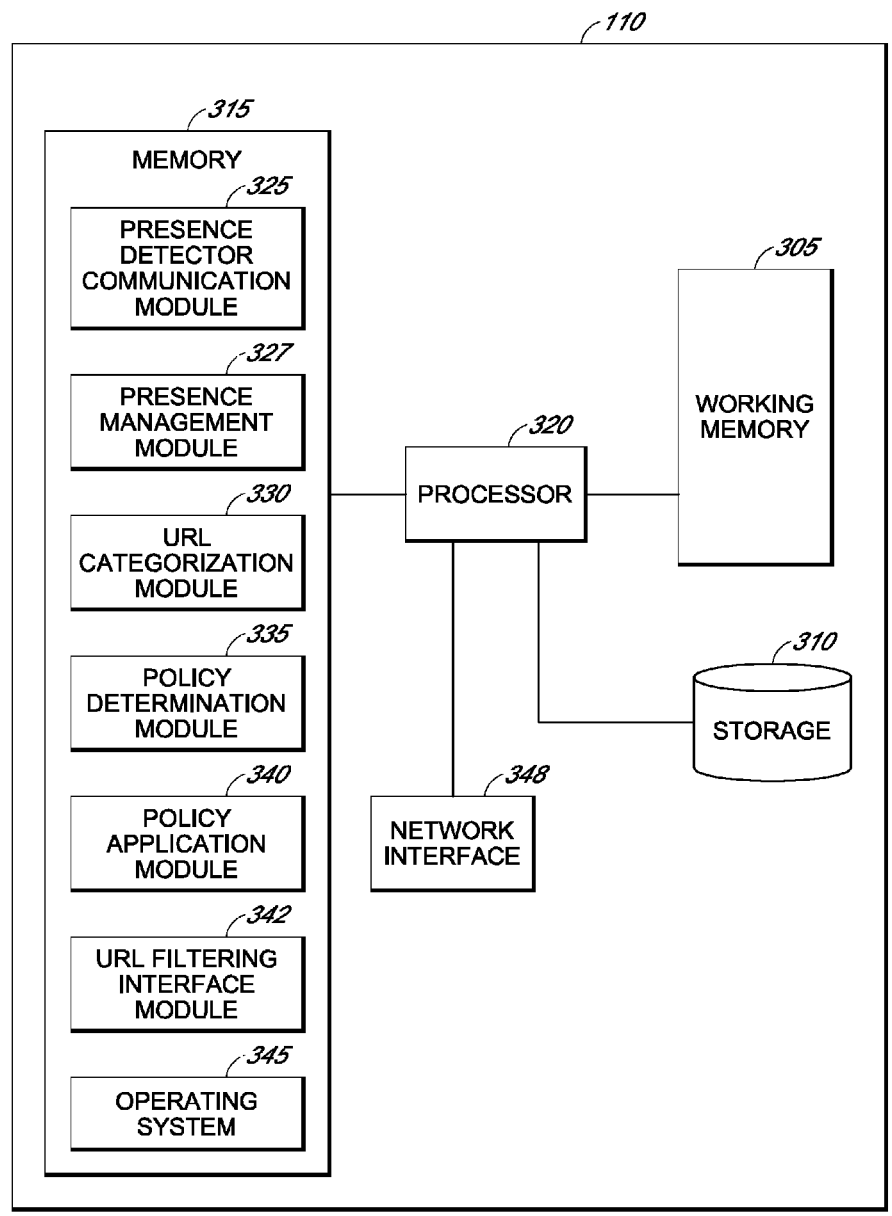
FIG. 3 is a functional block diagram of one implementation of a resource manager 110.

FIG. 3 is a functional block diagram of one implementation of a resource manager 110. In the illustrated implementation, resource manager 110 is implemented as a URL filtering server. The URL filtering server 110 includes a processor 320. Operatively coupled to the processor 320 is a working memory 305, a storage 310, a memory 315, and a network interface 348. The memory 305 stores several modules that include instructions for processor 320. These instructions configure the processor to perform functions of URL filtering server 110. For example, a presence detector communication module 325 includes instructions that configure the processor to communicate with a presence detector, such as presence detector 115, illustrated in FIG. 2.

A presence management module 327 includes instructions that configure the processor to detect and maintain presence information for one or more client computers, such as computers 105a-i illustrated in FIG. 1. For example, the presence management module 327 may receive presence information from a presence detector, such as presence detector 115 in FIG. 2, via the presence detector communication module 325. The presence information received from the presence detector 115 may relate to the client computer upon which the presence detector 115 is running. For example, the presence information may relate to a managed resource consumer or client computer 105.

A URL categorization module 330 includes instructions that configure processor 320 to categorize a URL. For example, in some implementations, module 330 may categorize a URL by searching for the URL in a URL categorization database, such as database 120 illustrated in FIG. 2. The URL categorization database may map the URL to one or more categories. In some other implementations, the URL categorization module may configure processor 320 to categorize a URL by performing dynamic categorization of the network content identified by the URL. For example, when a request for access to content identified by a URL is received by the resource manager 110, the resource manager 110 may retrieve the Internet content identified by the URL. The content may then be analyzed to determine the category of the URL. For example, particular keywords or images may be identified in the content in order to assign the URL to one or more categories.

A policy determination module 335 includes instructions that configure processor 320 to identify an applicable policy for a URL request. For example, when a URL is received by the resource manager 110, the policy that is appropriate for the URL may be determined based on one or more attributes of the URL or data associated with the URL. For example, attributes that may be used to determine the appropriate policy for the URL include the time of day, the user requesting access to the URL, or the IP address of the client computer requesting access to the URL. In some implementations, a directory server may be consulted by the policy determination module 335 to identify one or groups defined by the directory to which the user requesting access to the URL belongs. These one or more groups may also be used to determine, at least in part, a policy to apply to the URL access request. Presence information associated with the computer requesting access to the URL may be used to determine the appropriate policy to apply the URL request. Whether the presence information indicates a first presence state or a second presence state may determine the policy applied to the URL request.

A policy application module 340 includes instructions that configure processor 320 to apply a policy to a URL access request. For example, the policy application module 340 may compare the URL category determined by the URL categorization module 330 against one or more allowed categories determined by a policy determined by the policy determination module 335. If the URL category is allowed by the determined policy, then access to the URL may be allowed by the resource manager 110. Conversely, if the policy indicates access to URL's in that category are not authorized, the requesting computer may be blocked from accessing content identified by the URL.

A URL filtering interface module 342 includes instructions that configure the processor 320 to provide URL filtering services. In some implementations, the URL filtering interface module 342 may implement a web service interface that allows interface clients, such as firewall 125 in FIG. 1, to send resource requests 111 to the URL filtering server 110. For example, some implementations may utilize a REST based interface while other implementations may use a SOAP based interface. Other interface designs are also contemplated. Some implementations may expose a sockets interface with a custom API to provide a resource request interface to the resource manager 110.

An operating system module 345 may include instructions that configure the processor 320 to manage the hardware and software resources of resource manager 110. For example, operating system module 345 may include instructions that provide for the modules described above to communicate over network interface 348. Operating system module 345 may also provide instructions that allow the modules described above to communicate with each other, or to utilize storage space provided by storage 310 or working memory 305.

Figure 4:
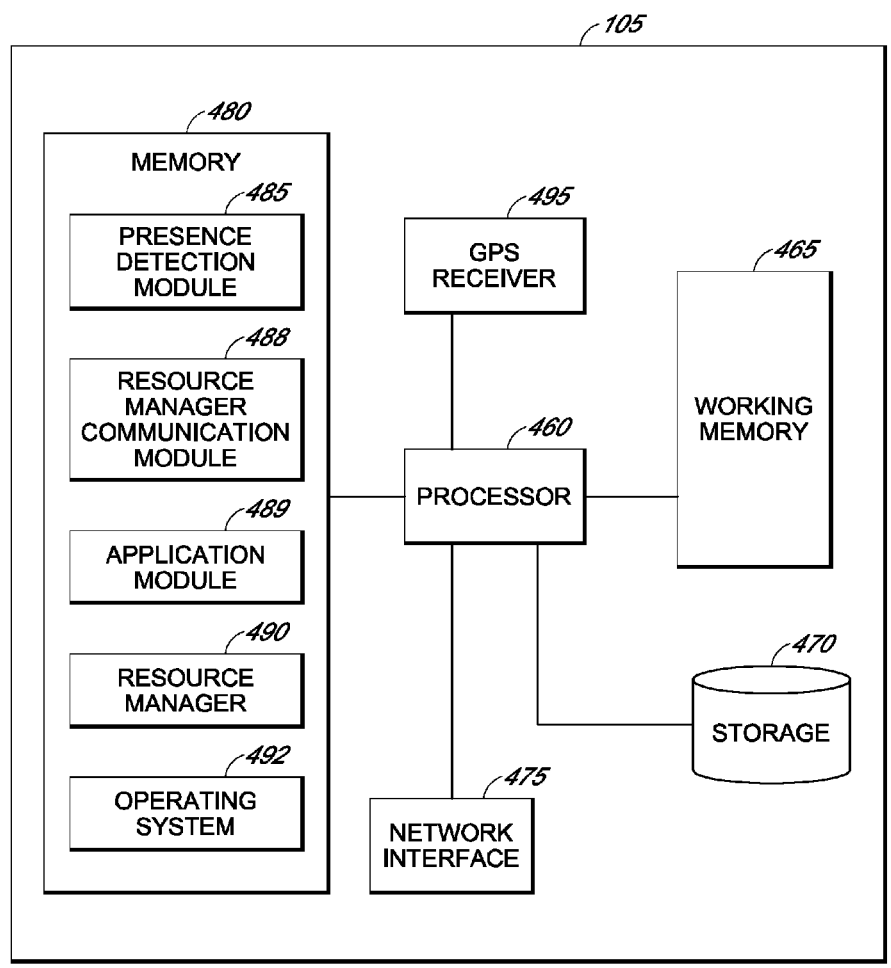
FIG. 4 is a functional block diagram of one implementation of a managed resource consumer 105.

FIG. 4 is a functional block diagram of one implementation of a managed resource consumer 105. In the illustrated implementation, managed resource consumer 105 is a client computer, as illustrated in FIG. 2. The client computer 105 includes a processor 460, gps receiver 495, working memory 465, network interface 475, a storage 470, and a memory 480. The memory 480 stores multiple modules that include instructions that configure processor 460 to perform functions of client computer 105. A presence detection module 485 includes instructions that configure processor 460 to detect presence information relating to computer 105. For example, the presence detection module 485 may detect whether an interactive session is active on client computer 105. Other presence information may also be detected by the presence detection module 485. For example, the presence detection module 485 may detect the physical location of client computer 105. To accomplish this, presence detection module 485 may read location values from a GPS receiver 495 in some implementations.

A resource manager communication module 488 includes instructions that communicate the client computer's presence information, detected by the presence detection module 485, to a resource manager, such as the resource manager 110, illustrated in FIG. 2 or FIG. 3.

The client computer 105 also includes an application module 489. The application module 489 includes instructions that configure processor 460 to implement one or more applications that utilize resources managed by a resource management system. For example, in some implementations, the application module 489 may implement one or more applications that consume hardware resources on client computer 105. For example, application module 489 may consume processor time on processor 460, memory space from working memory 465, or storage space from storage 470. Access to these resources may be controlled by resource manager module 490 discussed below.

In other implementations, application module 489 may implement one or more network applications that send or receive network data over network interface 475. For example, the instructions in application module 489 may implement an internet browsing program. Alternatively, the instructions may implement an instant messaging client, streaming client, or file transfer application. Application module 489 may also implement a custom application that sends and receives network data.

A resource manager module 490 includes instructions that manage resources of client computer 105 used by application module 489. In some implementations, the resource manager module 490 authorizes access to resources based, at least in part, on presence information for client computer 105. For example, resource manager module 490 may manage use of the GPS receiver 495, working memory 465, storage 470, or network interface 475 based on presence information, such as whether an interactive session is present on client computer 105. Note that the resource manager module 490 stored in memory 480 may not be included in all implementations. For example, in some other implementations, the resource manager 490 may be external to client computer 105. Some implementations may utilize a resource manager 110 as a resource manager 110. In these implementations, client computer 105 may request authorization to use or access resources from the external resource manager. In still other implementations, there may be an external resource manager and also a resource manager 490 included in the client computer 105. For example, an external resource manager may manage resources external to client computer 105, such as network resources, while an internal resource manager 490 may manage resources internal to client computer 105.

An operating system module 492 includes instructions that configure processor 460 to manage the software and hardware resources of client computer 105. For example, the resource manager communication module 488 may invoke subroutines in the operating system module 492 to send or receive network data over network interface 475. Subroutines in operating system module 492 may also be used to store data to data storage 470 or use working memory 465. Note that in some implementations, a local resource manager such as resource manager 490 may be closely integrated with or part of operating system module 492.

Figure 5:
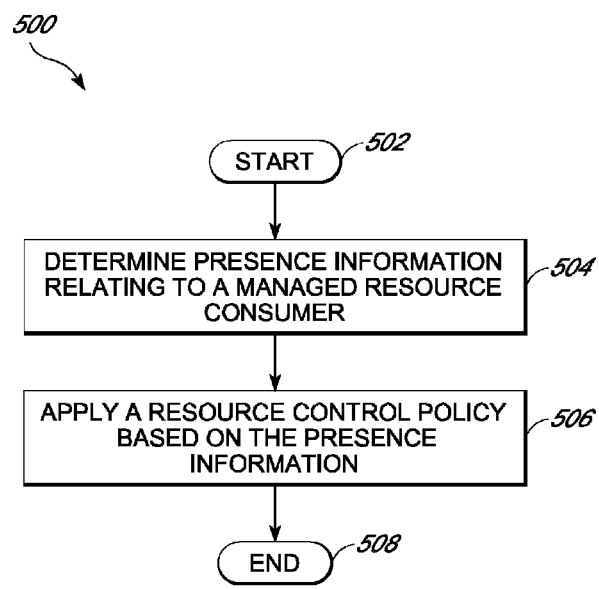
FIG. 5 is a flowchart illustrating one embodiment of a method for managing computing resources based on presence information.

FIG. 5 is a flowchart illustrating one embodiment of a method for managing computing resources based on presence information. Process 500 may be implemented in some implementations by a resource manager 110, illustrated in FIG. 2. Some implementations may implement process 500 in a URL filter server, such as resource manager 110, illustrated in FIGS. 2 and 3. Process 500 begins at start block 502 and then moves to block 504, where presence information relating to a managed resource consumer is determined. In some implementations, a managed resource consumer may be a client computer, such as one of client computers 105a-i, illustrated in FIG. 2. In other implementations, a managed resource consumer may be an application running on a client computer, such as application module 289 illustrated in FIG. 4.

Presence data determined in block 504 may relate to one or more characteristics of a managed resource consumer. For example, the presence data may indicate the physical location of the managed resource consumer, the location of the managed resource consumer within a particular network topology, the security level of the network connection used by the managed resource consumer, or the speed of the network connection used by the managed resource consumer. If the managed resource consumer is a client computer, the presence information may relate to whether a screen saver is currently active on the client computer, or whether the console of the client computer is currently locked. The presence information may also indicate whether any input has been received from a physically attached keyboard or pointing device within a time period, or how much idle time there has been on the client computer within a time period. The presence information may also indicate whether any programs implementing an interactive shell are running on the client computer, or if they are running, how much processing time they have consumed during a time period. Alternatively, how much time has elapsed since interactive shells running on the client computer have consumed CPU processing time may be included in the presence information. Processing block 504 may be implemented by instructions included in the presence management module 327, illustrated in FIG. 3.

Table 1 below illustrates presence data in some implementations. Some embodiments may implement one or more of the examples of presence data shown, and not implement other examples. In addition, some implementations may include additional presence data not shown in Table 1. Table 1 is provided only to show examples of presence data in some implementations and is not intended to be limiting:

TABLE 1

| First Presence State | Second Presence State | Third Presence State |
|---|---|---|
| *Physical Location Oriented Presence* | | |
| MRC in Country X | MRC in Country Y | MRC in Country Z |
| MRC in Zip Code 1 | MRC in Zip Code 2 | MRC in Zip Code 3 |
| MRC on Corporate Headquarters Campus | MRC at Branch Office | MRC not located on Corporate Campus |
| *Location relative to Network Topology* | | |
| MRC directly connected to Corporate Intranet | MRC connected to Corporate Intranet via VPN | None |
| *Interactivity Related Presence State* | | |
| Screen Saver Active on Console | Screen Saver not Active on Console | None |
| No Interactive Shell Program running | Interactive shell program running | Interactive shell program active within last T time period |
| No input received from directly connected input device such as keyboard or pointing device within T time period | Input received from directly connected input device such as keyboard or pointing device within T time period | None |
| CPU Idle Time above threshold | CPU Idle Time below threshold | None |
| *Network Connection Related Presence State* | | |
| Secure connection between MRC and network | Insecure connection between MRC and network | None |
| Speed of network used by MRC is below speed threshold | Speed of network used by MRC is above speed threshold | None |

Process 500 then moves to processing block 506, where a resource control policy is applied based on the presence information. Processing block 506 may be implemented by instructions included in the policy application module 340, illustrated in FIG. 3. Alternatively, a combination of instructions in the URL categorization module 330, policy determination module 335, and policy application module 340 may implement processing block 506. Process 500 then moves to end block 508 and terminates.

Tables 2-4 below illustrates example resource control policies in some implementations. The resource policies may vary based, at least in part, on presence information.

TABLE 2

Location or Interactivity Related Resource Control Policies

| | First Presence State | Second Presence State | Third Presence State |
|---|---|---|---|
| Resource Control Policy Examples | Transmit or receive Rate Limit at first threshold | Transmit or receive Rate Limit at second threshold | Transmit or receive Rate Limit at third threshold |
| | Network route used for communication set to route 1 | Network route used for communication set to route 2 | Network route used for communication set to route 3 |
| | Encryption not required for network communication | Encryption required for communication | None |
| | Network data sent or received is not required to be signed | Network data sent or received is required to be signed | None |
| | URL category set 1 is allowed | URL category set 2 is allowed | URL category set 3 is allowed |
| | Network application set 1 is allowed | Network application set 2 is allowed | Network application set 3 is allowed |
| | Sending or receiving network data on network port set 1 is allowed | Sending or receiving network data on network port set 2 is allowed | Sending or receiving network data on network port set 2 is allowed |
| | Email sent by MRC includes headers H1 or footers F1 | Email sent by MRC includes headers H2 or footers F2 | Email sent by MRC includes headers H3 or footers F3 |

TABLE 3

Network Connection Related Resource Control Policies

| | First Presence State | Second Presence State | Third Presence State |
|---|---|---|---|
| Resource Control Policy Examples | Require Data Sent or received to be encrypted | Do not Require Data Sent or Received to be Encrypted | None |
| | Require all data sent or received to be electronically signed | Require sent or received and data meeting a set of characteristics to be electronically signed | Do not require data sent or received to be electronically signed |
| | Limit the speed of data sent or received on network connection below a first threshold | Limit the speed of data sent or received on network connection below a second threshold | Do not limit the speed of data sent or received on the network connection |
| | Do not require data sent or received on network connection to be compressed | Require a first level of compression for data sent or received on network connection. | Require a second level of compression for data sent or received on network connection. |

TABLE 4

Interactivity Related Resource control Policies

| | First Presence State | Second Presence State | Third Presence State |
|---|---|---|---|
| Resource Control Policy Examples | Allowed URL categories is URL category set 1 | Allowed URL categories is URL category set 2 | Allowed URL categories is URL category set 3 |
| | Email can be sent or received | Email can be received but not sent | No email can be sent or received |
| | Protocol ports which can send data is port set 1 | Protocol ports which can send data is port set 2 | Protocol ports which can send data is port set 3 |
| | Protocol ports which can receive data is port set 4 | Protocol ports which can receive data is port set 5 | Protocol ports which can receive data is port set 6 |
| | Max amount of CPU utilization, or I/O channel utilization, or network data sent, or network data received, is below a first threshold | Max amount of CPU utilization, or I/O channel utilization, or network data sent, or network data received, is below a second threshold | No limit on the use of CPU, or I/O channel, or network data sent or received. |

Figure 6:
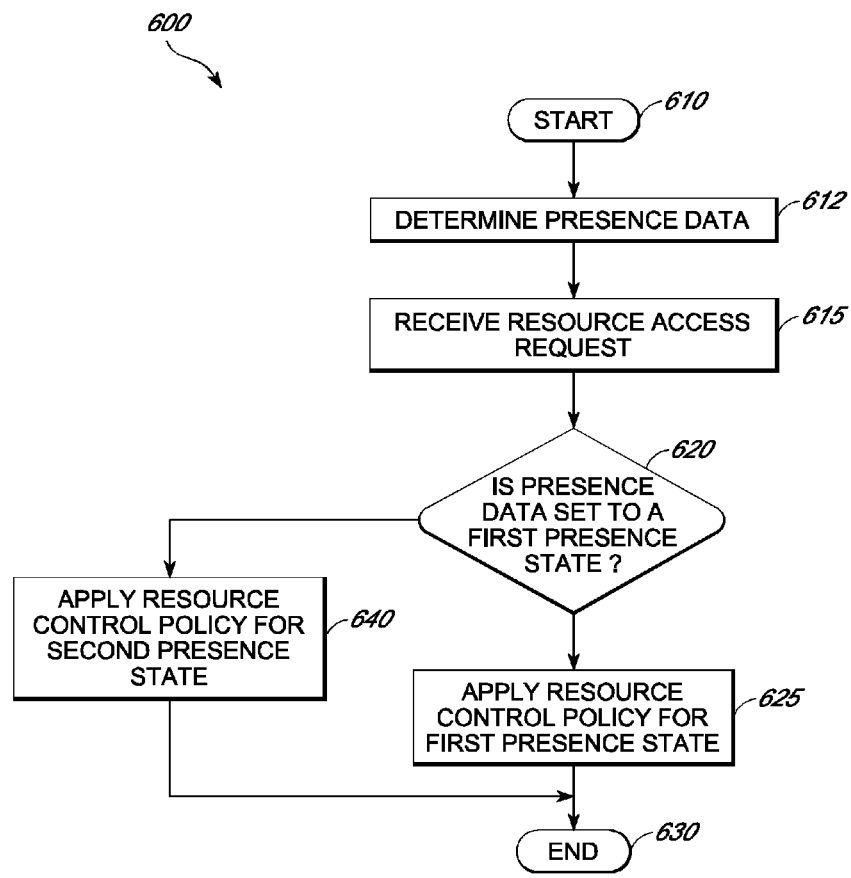
FIG. 6 is a flowchart illustrating one embodiment of a method for managing computing resources based on presence information.

FIG. 6 is a flowchart illustrating one embodiment of a method for managing computing resources based on presence information. Process 600 may be implemented by a resource manager 110, as illustrated in FIG. 2, or the resource manager 110 illustrated in FIGS. 2 and 3, which is implemented as a URL filter server. Alternatively, process 600 may be implemented by a network infrastructure component such as, a firewall, (such as firewall 125 illustrated in FIG. 1), proxy server, router, cache, router, or switch. Process 600 begins at start block 610 and then moves to processing block 612, where presence data is determined. Processing block 612 may be implemented by instructions included in the presence management module 327, illustrated in FIG. 3. The presence data determined in processing block 612 may include any of the presence examples or data types discussed above with respect to processing block 504 in FIG. 5. Process 600 then moves to block 615, where a resource access request is received. This resource access request may be resource access request 111 illustrated in FIG. 1 or 2 in some implementations.

The type of resource requested in block 615 may vary by implementation. For example, some implementations may request access to hardware resources, such as memory, disk space, I/O channel bandwidth, or processor time in processing block 615. Other implementations may request access to network resources. For example, network resources requested in block 615 may include network content identified by a URL, an ability to send or receive network data or packets over one or more network protocols or ports, or the ability to send or receive network data at a particular rate. Requests for network resources may also include an ability to send or receive network data. These are examples and are not intended to be limiting.

Once the resource access request is received in processing block 615, process 600 moves to decision block 620, which determines whether the presence data determined in processing block 612 is set to a first presence state. A first presence state may represent any presence state that can be distinguished from another presence state. For example, any of the presence states described in Table 1 may be a first presence state and evaluated in decision block 620.

While only two values of a presence state are illustrated in FIG. 6 (a first presence state and a second presence state), it should be understood that presence data may have any number of states or values. Some implementations of process 600 therefore may distinguish between more than two values of presence data and apply more than two different resource control policies depending on the value of the presence data. Additionally, some implementations of process 600 may define ranges of presence data, with the ranges determining which resource control policy is applied to the resource access request received in processing block 615.

If the presence data is set to the first presence state, process 600 moves to block 625, where a resource control policy associated with the first presence state is applied to the resource access request. If it is determined in block 625 that the presence state is not set to a first presence state, then process 600 moves to processing block 640, where a resource control policy associated with a second presence state is applied. In either case, process 600 then moves to end block 630 and terminates.

Figure 7:
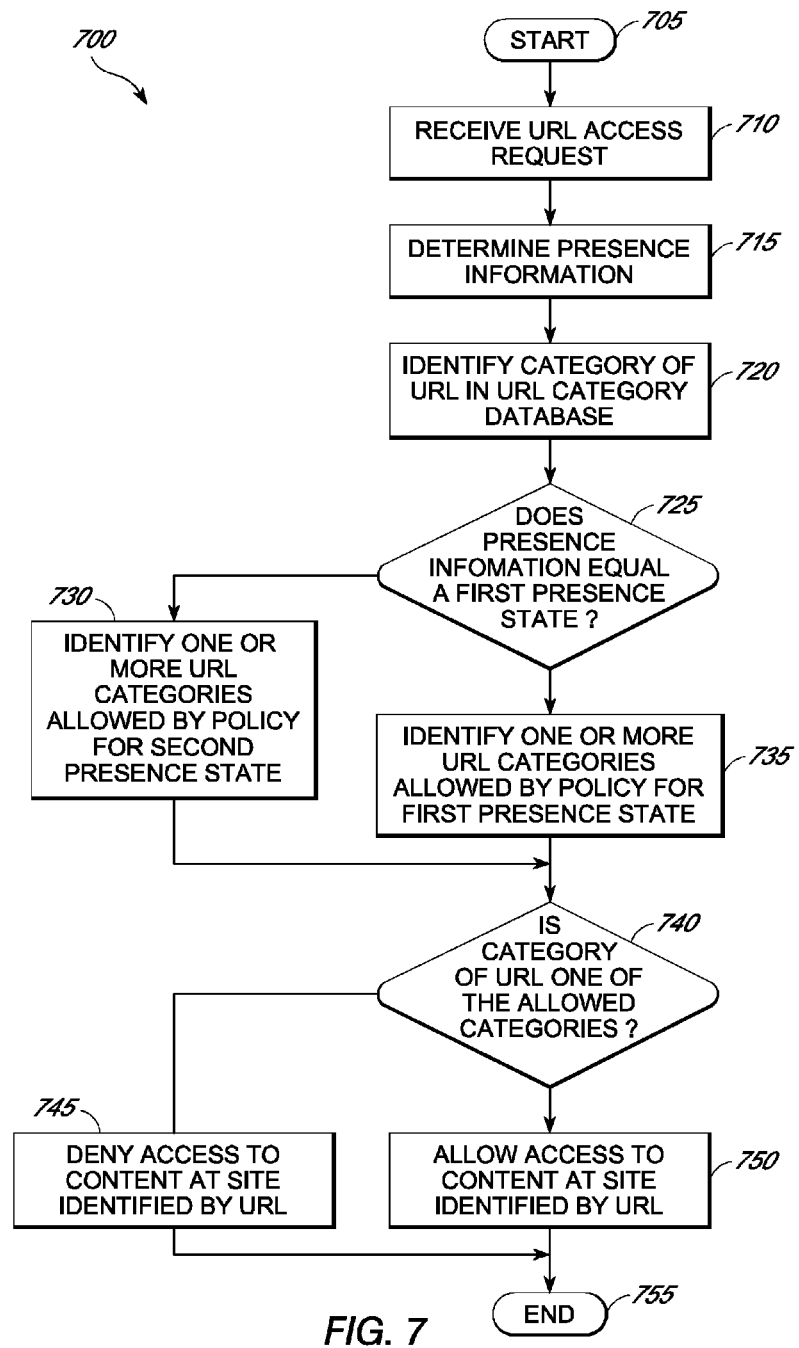
FIG. 7 is a flowchart illustrating one embodiment of a method for managing resources based on presence information.

FIG. 7 is a flowchart illustrating one embodiment of a method for managing resources based on presence information. Process 700 may be implemented by instructions included in a resource manager module 110, illustrated in FIG. 1, or a resource manager 110 illustrated in FIG. 1 or FIG. 3. Process 700 begins at start block 705 and then moves to processing block 710. In processing block 710, a URL access request is received. The URL access request may be a resource request 111 illustrated in FIG. 2. The URL access request may be in the form of an http request in some implementations. The URL access request of processing block 710 may include information in addition to the URL being requested. For example, it may include the IP address of the client computer requesting access to the URL or the user name of a user logged into the client computer and requesting the URL.

In processing block 715, presence data for the client computer generating the URL access request is determined. For example, in some implementations, a database of presence information for each client computer on a communication network may be maintained. Processing block 715 may search the database for presence information based on information received in the URL access request of processing block 710. For example, in some implementations it may determine the presence information based on the source IP address or user specified in the URL access request.

In processing block 720, the category of the URL received in the URL access request of processing block 710 is determined. For example, to determine the category of the URL, some implementations may search a URL category database mapping URLs to one or more categories. Some other implementations may perform dynamic characterization of the URL. For example, in block 720, the network content identified by the URL may be retrieved. The content may be parsed and characterizations of the content performed based on attributes of the content such as links included in the content, keywords detected in the content, pictures or graphics included in the content etc. Based on this analysis, one or more categories of the content may be determined.

In decision block 725, process 700 determines if the presence information determined in block 715 is equal to a first presence state. The first presence state and second presence state referred to in block 725, 730, and 735 may be at least any of the presence states described in Table 1 above. If the presence information in block 725 does equal a first presence state, process 700 moves to block 735, where one or more URL categories that are allowed when the presence information equals the first presence state are determined. If the presence information in block 725 does not equal a first presence state, process 700 moves to block 730, where one or more URL categories allowed by a policy configured for a second presence state are determined.

Process 700 then moves to decision block 740, where it is determined if the category of the URL determined in processing block 720 is in one of the allowed categories. If the URL category is allowed, process 700 moves to processing block 750, where access to content at the site identified by the URL is allowed. In processing block 750, a reply message may be sent to the sender of the URL access request received in processing block 710, with a status code indicating the request is allowed. Conversely, if in block 740 it is determined that the category of the URL requested is not allowed, process 700 moves to processing block 745, where access to the content identified by the URL is denied. In some implementations, processing block 745 may send a reply to the sender of the URL access request, with a status code indicating that access to the content identified b the URL is not authorized. Process 700 then moves to end block 755 and terminates.

Figure 8:
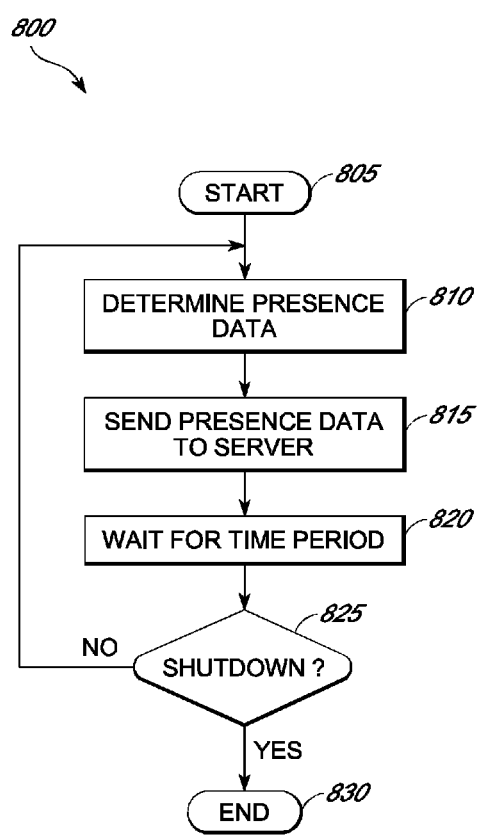
FIG. 8 is a flowchart illustrating one embodiment of a method for generating presence data.

FIG. 8 is a flowchart illustrating one embodiment of a method for generating presence data. Process 800 may be performed in some implementations by presence detectors 105 as illustrated in FIG. 1. In some implementations, a presence detector 105 illustrated in FIG. 2 and FIG. 4 may perform process 800. Process 800 may also be implemented by instructions included in the presence detection module 285 and the URL filter communication module 288, illustrated in FIG. 3. Process 800 begins at start block 805 and then moves to processing block 810, where presence data is determined. For example, process 800 may determine any of the example presence data shown in Table 1 above.

In processing block 815, the presence data determined in block 810 is sent to a server. For example, in some implementations, the server may be a URL filtering server 110 as illustrated in FIG. 1. However, other embodiments may send the presence information to other types of servers. For example, a server may include a network control server such as a firewall or other network infrastructure device. Servers may also include other applications, processes or threads running on the computer performing process 800. For example, presence information may be sent to a hardware resource manager operating on the client computer running process 800 to control hardware resources of a client computing device.

In processing block 820, process 800 waits for a time period. Processing block 820 may be performed in order to efficiently manage the client processing resources consumed by process 800. For example, without a wait period defined by processing block 820, process 800 may continuously send presence data to a server, unnecessarily consuming resources on the computer running process 800.

The length of the time period in block 820 may vary by implementation. Some implementations may wait less than one second. Other implementations may wait for 5, 10, 15, or 20 seconds. Any waiting period between 1 microsecond and 30 minutes may be used by various implementations. Implementations may determine the specific time period based on implementation specific trade-offs between accuracy and timeliness of presence information, which benefits from a shorter time period, and consumption of processing and other resources, which are reduced when using longer time periods.

After the time period of processing block 820 has elapsed, process 800 moves to decision block 825, which determines whether process 800 should shutdown. A shutdown may be appropriate, for example, if the computer running process 800 is shutting down. If a shutdown should be performed, process 800 moves to end block 830 and process 800 terminates. If it is determined in block 525 that no shutdown should be performed, process 800 then returns to processing block 810 and process 800 repeats.

Figure 9:
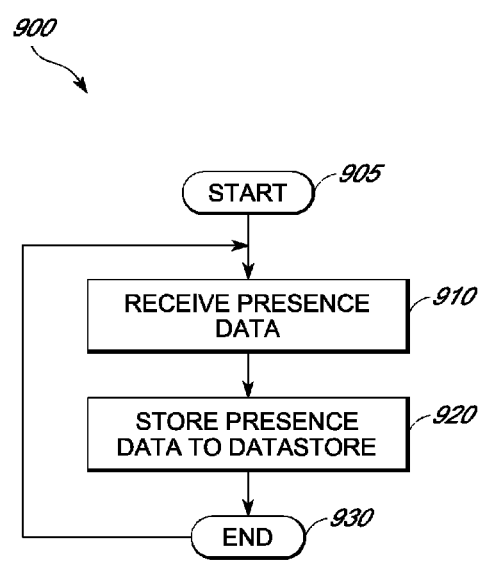
FIG. 9 is a flowchart illustrating one embodiment of determining presence data.

FIG. 9 is a flowchart illustrating one embodiment of determining presence data. Process 900 may be performed in some implementations by a resource manager 110, as illustrated in FIG. 1, or a URL filtering server, such as URL filtering server 110 illustrated in FIG. 2. Process 900 may be implemented by instructions included in the presence management module 327, illustrated in FIG. 3. Process 900 begins at start block 905 and then moves to block 910 where presence data is received. Presence data may be received from a presence detector 115, as illustrated in FIG. 2. Some implementations may implement a presence detector, such as presence detector 115 illustrated in FIG. 2 as a presence detector. Process 900 then moves to processing block 920 where the received presence data is stored to a data store. In some implementations, the presence data may be stored in a database. In other implementations, an in memory datastore may be used, such as working memory 305 illustrated in FIG. 3. The presence data stored in block 920 may later be read by other processes, for example, process 700 illustrated in FIG. 7 may read presence data from the datastore of processing block 560 in processing block 715 of FIG. 7. After the presence data is stored, process 900 moves to block 930 where process 900 terminates.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various subroutines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

I claim:

1. A method of reducing risk associated with a computer that may be infected with a malicious application comprising:
    receiving, from the computer over a network, first presence data indicating a first interactivity level of more than two interactivity levels of a logged in user of the computer;
    receiving a first network request by the logged in user from the computer for first resources external to the computer;
    executing instructions on computer hardware to determine a first resource control policy to apply to the first network request by the logged in user for the first resources external to the computer based on the first interactivity level;
    executing instructions on computer hardware to apply the first resource control policy to the first request for resources;
    receiving, from the computer over the network, second presence data indicating a different second interactivity level of the more than two interactivity levels of the logged in user of the computer;
    receiving a second network request by the logged in user from the computer for second resources external to the computer;
    executing instructions on computer hardware to determine a second resource control policy to apply to the second network request by the logged in user for the second resources external to the computer based on the second interactivity level; and
    executing instructions on computer hardware to apply the second policy to the second request.

2. The method of claim 1, wherein the first and second interactivity levels are received over the network from an agent running on the computer.

3. The method of claim 2, wherein the interactivity level is based on whether an input has been received from an input device directly connected to the computer within a time period.

4. The method of claim 2, wherein the interactivity level is based on whether an interactive shell is running on the computer.

5. The method of claim 2, wherein the interactivity level is based on whether a screen saver is active on the computer's console.

6. The method of claim 1, wherein the interactivity level is based on the amount of idle CPU cycles on the computer within a time period.

7. The method of claim 1, wherein the interactivity level indicates whether the computer is communicating over a secure network connection.

8. The method of claim 1, wherein the interactivity level indicates the computer's location within a corporate network.

9. The method of claim 1, wherein the interactivity level indicates the physical location of the computer.

10. The method of claim 1, wherein the resource control policy controls the use of hardware resources of the computer.

11. The method of claim 1, wherein the resource control policy controls access to network data by the computer.

12. The method of claim 11, wherein the access to network data is controlled based, at least in part, on one or more content categories of a URL identifying the network data.

13. The method of claim 12 wherein a first set of URL categories are accessible to the computer when the interactivity level indicates a first state and a second set of URL categories are accessible to the computer when the interactivity level indicates a second state.

14. The method of claim 1, wherein the resource control policy controls whether network communication by the computer is encrypted.

15. The method of claim 1, wherein the resource control policy controls whether network data sent by the computer is compressed.

16. The method of claim 1, wherein the resource control policy controls whether network data sent by the computer is signed.

17. The method of claim 1, wherein the resource control policy controls the rate at which data sent or received by the computer may be transferred on a network.

18. The method of claim 1, wherein the resource control policy controls content of email messages sent by the computer.

19. The method of claim 1, further comprising receiving an indication of one or more display settings from the computer, wherein the determining of the resource control policy to apply to the first network request is further based on the received indication(s).

20. The method of claim 1, further comprising receiving an indication of whether a privacy shield is installed on the computer, wherein the determining of the first resource control policy to apply to the first network request is further based on the received indication.

21. An apparatus for reducing risk associated with a computer that may be infected with a malicious application, comprising:
 a memory;
 a processor, configured to fetch instructions from the memory; and
 a network interface, operatively coupled to the processor, wherein the memory stores:
  a presence management module, configured to cause the processor to receive first and second presence data comprising indications of different interactivity levels of a logged in user from the user's computer over a network via the network interface, wherein each of the first and second presence data indicates one of more than two interactivity levels,
  a URL filtering interface module, configured to cause the processor to receive first and second URL access requests including corresponding first and second requested URLs,
  a URL categorization module, configured to cause the processor to determine one or more URL categories for each of the requested URLs,
  a policy determination module, configured to cause the processor to determine a policy to apply to each of the requested URLs based, at least in part, on a different received interactivity level of the logged in user, and
  a policy application module, configured to cause the processor to authorize or not authorize access to each of the requested URLs by the computer based, at least in part, on the determined policy for that URL and the one or more URL categories corresponding to the URL.

22. The apparatus of claim 21, wherein the different interactivity levels are received over the network via the network interface from an agent running on the computer.

23. The apparatus of claim 21, wherein the URL access request is based, at least in part, on a request for the URL by the computer.

24. An apparatus for reducing risk associated with a computer that may be infected with a malicious application, comprising:
 means for communicating over a network;
 means for receiving a plurality of indications of different interactivity levels of a logged in user from the user's computer via the communicating means, each indication indicating one of more than two interactivity levels;
 means for receiving a network request from the user's computer for resources via the communication means; and
 means for applying a resource control policy to the received network request based on at least one of the received interactivity levels.

25. The apparatus of claim 24, further comprising:
 means for receiving a uniform resource locator (URL) request for network data;
 means for receiving an indication of the computer's location within a corporate network, wherein the resource control policy controls access to the network data based, at least in part, on one or more content categories of the URL and the computer's location within the corporate network.

26. A non-transitory computer readable medium, storing instructions that when executed by a processor perform a method of reducing risk associated with a computer that may be infected with a malicious application, the method comprising:
 receiving a plurality of indications of different interactivity levels of a logged in user from the user's computer over a network, each indication indicating one of more than two interactivity levels;
 receiving a network request from the user's computer for resources; and
 applying a resource control policy based on at least one of the received interactivity levels of the logged in user.

27. The non-transitory computer readable medium of claim 26, further comprising:
   receiving an indication of the computer's location within a corporate network; and
   receiving a uniform resource locator (URL) request for network data, and wherein the resource control policy controls access to the network data based, at least in part, on one or more content categories of the URL and the computer's location within the corporate network.

* * * * *